US012803181B2

(12) United States Patent
Huang et al.

(10) Patent No.: US 12,803,181 B2
(45) Date of Patent: Nov. 17, 2026

(54) ANTENNA MODULE

(71) Applicant: PEGATRON CORPORATION, Taipei City (TW)

(72) Inventors: Chin-Ting Huang, Taipei City (TW); Chun-Kai Wang, Taipei City (TW); Hsi-Kai Hung, Taipei City (TW); Chih-Hui Hsu, Taipei City (TW); Yu-Hsuan Lin, Taipei (TW)

(73) Assignee: PEGATRON CORPORATION, Taipei City (TW)

( * ) Notice: Subject to any disclaimer, the term of this patent is extended or adjusted under 35 U.S.C. 154(b) by 67 days.

(21) Appl. No.: 18/921,026

(22) Filed: Oct. 21, 2024

(65) Prior Publication Data

US 2025/0174914 A1 May 29, 2025

(30) Foreign Application Priority Data

Nov. 23, 2023 (TW) ................................ 112212768

(51) Int. Cl.
*H01Q 21/26* (2006.01)
*H01Q 5/378* (2015.01)
*H01Q 25/00* (2006.01)

(52) U.S. Cl.
CPC ............ *H01Q 21/26* (2013.01); *H01Q 5/378* (2015.01); *H01Q 25/001* (2013.01)

(58) Field of Classification Search
CPC ........ H01Q 1/38; H01Q 21/26; H01Q 25/001; H01Q 21/24; H01Q 1/36; H01Q 5/378; H01Q 5/385; H01Q 1/50
See application file for complete search history.

(56) References Cited

U.S. PATENT DOCUMENTS

2024/0204423 A1* 6/2024 Li .......................... H01Q 21/26
2024/0304992 A1* 9/2024 Wang ....................... H01Q 7/00

FOREIGN PATENT DOCUMENTS

CN 1688067 10/2005
CN 112310630 2/2021

* cited by examiner

*Primary Examiner* — Dimary S Lopez Cruz
*Assistant Examiner* — Anna N Hamadyk
(74) *Attorney, Agent, or Firm* — J.C. PATENTS

(57) ABSTRACT

An antenna module includes a ground plane, a first antenna structure, and a second antenna structure. A first ground end of a first radiator of the first antenna structure is connected to the ground plane. Two second radiators of the first antenna structure are disposed symmetrically to each other and apart from each other. Two second ground ends of the two second radiators are connected to the ground plane. The second antenna structure and the first antenna structure intersect to form an angle, and a third ground end of a third radiator of the second antenna structure is connected to the ground plane. Two fourth radiators of the second antenna structure are disposed symmetrically to each other and apart from each other. Two fourth ground ends of the two fourth radiators are connected to the ground end.

10 Claims, 3 Drawing Sheets

ANTENNA MODULE

CROSS-REFERENCE TO RELATED APPLICATION

This application claims the priority benefit of Taiwan application serial no. 112212768, filed on Nov. 23, 2023. The entirety of the above-mentioned patent application is hereby incorporated by reference herein and made a part of this specification.

BACKGROUND

Technology Field

The disclosure relates to an antenna module.

Description of Related Art

A conventional dual-polarized cross dipole antenna requires wiring three circuit boards, in which an antenna structure is complex, and a manufacturing cost is also high. How to manufacture a relatively simple antenna structure, reduce the manufacturing cost, and meet requirements of the industry for antenna frequency bands is a goal of research in the art.

SUMMARY

The disclosure provides an antenna module, which may form a dual-polarized cross dipole antenna in a relatively simple form, thereby achieving cost-saving effects and having good antenna performance.

An antenna module in the disclosure includes a ground plane, a first antenna structure, and a second antenna structure. The first antenna structure includes a first radiator and two second radiators. The first radiator includes a first feed end and a first ground end, and the first ground end is connected to the ground plane. The two second radiators are disposed symmetrically to each other and are spaced apart from each other. The two second radiators are disposed in parallel on one side of the first radiator and are spaced apart from the first radiator. The two second radiators include two first open ends and two second ground ends. The two first open ends are far away from each other. The two second ground ends are connected to the ground plane. The second antenna structure intersects the first antenna structure to form an angle, and includes a third radiator and two fourth radiators. The third radiator includes a second feed end and a third ground end. The third ground end is connected to the ground plane. The two fourth radiators are disposed symmetrically to each other and are spaced apart from each other. The two fourth radiators are disposed in parallel on one side of the third radiator and are spaced apart from the third radiator. The two fourth radiators include two second open ends and two fourth ground ends. The two second open ends are far away from each other. The two fourth ground ends are connected to the ground plane.

In an embodiment of the disclosure, the second antenna structure is perpendicular to the first antenna structure, and the third radiator straddles the first radiator and is spaced apart from the first radiator.

In an embodiment of the disclosure, each of the first radiator, the two second radiators, the third radiator, and the two fourth radiators has at least one bend.

In an embodiment of the disclosure, each of the first radiator and the third radiator is in a U shape, and each of the two second radiators and the two fourth radiators is in an L shape.

In an embodiment of the disclosure, a projection of the first radiator on a plane where the two second radiators are located partially overlaps the two second radiators, and a projection of the third radiator on a plane where the two fourth radiators are located partially overlaps the two fourth radiators.

In an embodiment of the disclosure, the first radiator includes a first section, a second section, and a third section that are connected in sequence. The first feed end is located at the first section. The first ground end is located at the third section. The two second radiators include two fourth sections and two fifth sections. The two second ground ends are located at the two fourth sections. The two first open ends are located at the two fifth sections. The third radiator includes a sixth section, a seventh section, and an eighth section that are connected in sequence. The second feed end is located at the sixth section. The third ground end is located at the eighth section. The two fourth radiators include two ninth sections and two tenth sections. The two fourth ground ends are located at the two ninth sections. The two second open ends are located at the two tenth sections. The seventh section straddles the second section and is spaced apart from the second section.

In an embodiment of the disclosure, a projection of the first radiator on a plane where the two second radiators are located overlaps the two fourth sections, and a projection of the third radiator on a plane where the two fourth radiators are located overlaps the two ninth sections.

In an embodiment of the disclosure, extension directions of the first section, the third section, the two fourth sections, the sixth section, the eighth section, and the two ninth sections are parallel to each other. Extension directions of the second section and the two fifth sections are parallel to each other. Extension directions of the seventh section and the two tenth sections are parallel to each other.

In an embodiment of the disclosure, the first antenna structure resonates at a frequency band. A length of the first radiator is ¾ times a wavelength of the frequency band. The second antenna structure resonates at the frequency band. A length of the third radiator is ¾ times the wavelength of the frequency band.

In an embodiment of the disclosure, the first antenna structure resonates at a frequency band. A distance between the two first open ends of the two second radiators is ½ times a wavelength of the frequency band. The second antenna structure resonates at the frequency band. A distance between the two second open ends of the two fourth radiators is ½ times the wavelength of the frequency band.

In an embodiment of the disclosure, the antenna module further includes a first insulation plate and a second insulation plate. The first radiator is disposed on a first surface of the first insulation plate, and the two second radiators are disposed on a second surface of the first insulation plate. The third radiator is disposed on a third surface of the second insulation plate, and the two fourth radiators are disposed on a fourth surface of the second insulation plate.

Based on the above, the first ground end of the first radiator of the first antenna structure of the antenna module in the disclosure is connected to the ground plane. The two second radiators of the first antenna structure are disposed symmetrically to each other and are spaced apart from each other. The two first open ends of the two second radiators are far away from each other. The two second ground ends of the two second radiators are connected to the ground plane. The second antenna structure and the first antenna structure intersect to form an angle, and the third ground end of the third radiator of the second antenna structure is connected to the ground plane. The two fourth radiators of the second antenna structure are disposed symmetrically to each other and are spaced apart from each other. The two second open ends of the two fourth radiators are far away from each other. The two fourth ground ends of the two fourth radiators are connected to the ground plane. Through the above design, the antenna module may form the dual-polarized cross dipole antenna in a relatively simple form, thereby achieving the cost-saving effects and having the good antenna performance.

DETAILED DESCRIPTION OF DISCLOSED EMBODIMENTS

Figure 1:
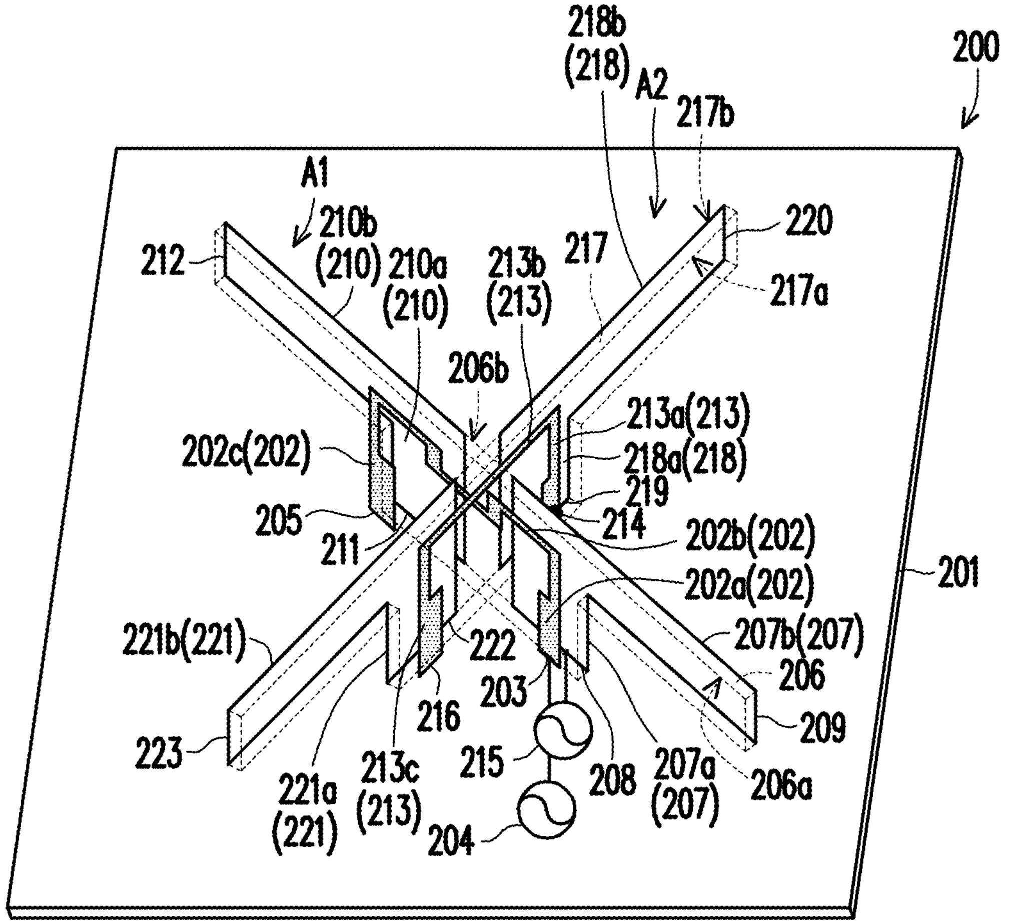
FIG. 1 is a schematic diagram of an antenna module according to an embodiment of the disclosure.
Figure 2A:
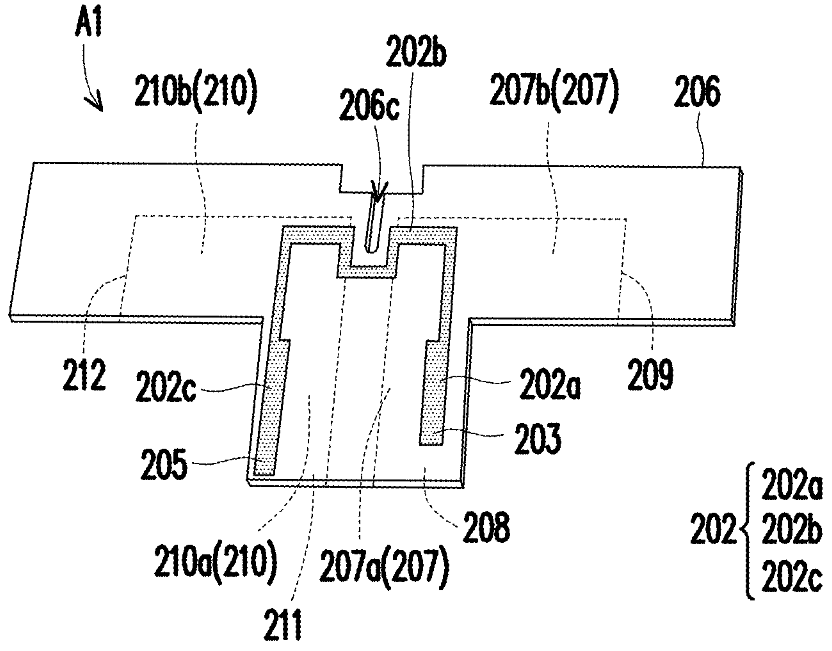
FIG. 2A is a schematic diagram of a first antenna structure of the antenna module in FIG. 1.
Figure 2B:
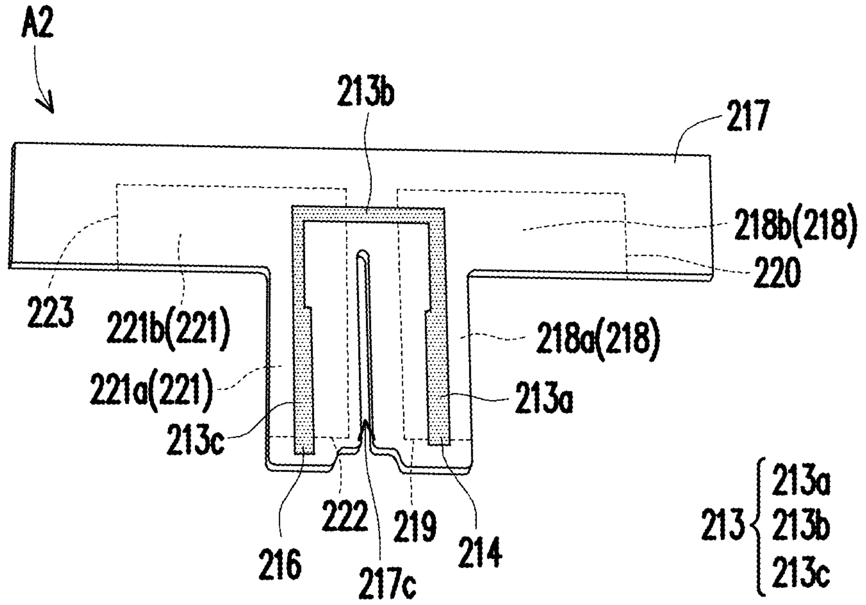
FIG. 2B is a schematic diagram of a second antenna structure of the antenna module in FIG. 1.

FIG. 1 is a schematic diagram of an antenna module according to an embodiment of the disclosure. FIG. 2A is a schematic diagram of a first antenna structure of the antenna module in FIG. 1. FIG. 2B is a schematic diagram of a second antenna structure of the antenna module in FIG. 1. It should be noted that in FIG. 1, a first insulation plate and a second insulation plate are shown in perspective and are represented by dotted lines, and in FIGS. 2A and 2B, structures on a second surface of the first insulation plate and a fourth surface of the second insulation plate are represented by dotted lines.

Referring to FIGS. 1 to 2B, an antenna module 200 in this embodiment includes a ground plane 201, a first antenna structure A1, a second antenna structure A2, a first insulation plate 206, and a second insulation plate 217.

As shown in FIGS. 1 and 2A, the first antenna structure A1 includes a first radiator 202 and two second radiators 207 and 210. The first radiator 202 is disposed on a first surface 206*a* of the first insulation plate 206, and the two second radiators 207 and 210 are disposed on a second surface 206*b* of the first insulation plate 206. Each of the first radiator 202 and the two second radiators 207 and 210 has at least one bend. In this embodiment, the first radiator 202 is in a U shape, and each of the two second radiators 207 and 210 is in an L shape. However, the disclosure is not limited thereto.

Specifically, the first radiator 202 includes a first feed end 203 and a first ground end 205. The first ground end 205 is connected to the ground plane 201. The first radiator 202 includes a first section 202*a*, a second section 202*b*, and a third section 202*c* that are connected in sequence. The first feed end 203 is located in the first section 202*a*, and the first ground end 205 is located in the third section 202*c*. The first feed end 203 is connected to a first signal feed source 204.

The two second radiators 207 and 210 are disposed symmetrically to each other and are spaced apart from each other, and the two second radiators 207 and 210 are disposed in parallel on one side of the first radiator 202 and are spaced apart from the first radiator 202 by the first insulation plate 206. A projection of the first radiator 202 on a plane where the two second radiators 207 and 210 are located partially overlaps the two second radiators 207 and 210.

The two second radiators 207 and 210 include two first open ends 209 and 212 and two second ground ends 208 and 211. The two first open ends 209 and 212 are far away from each other, and the two second ground ends 208 and 211 are connected to the ground plane 201. The two second radiators 207 and 210 include two fourth sections 207*a* and 210*a* and two fifth sections 207*b* and 210*b*. The two second ground ends 208 and 211 are located at the two fourth sections 207*a* and 210*a*, and the two first open ends 209 and 212 are located at the two fifth sections 207*b* and 210*b*. The projection of the first radiator 202 on the plane where the two second radiators 207 and 210 are located overlaps the two fourth sections 207*a* and 210*a*.

The first antenna structure A1 resonates at a frequency band. In this embodiment, the frequency band is between 3300 MHz and 3800 MHz, which may meet requirements for an operating frequency range of 5G n78, but the frequency band is not limited thereto. A length of the first radiator 202 is ¾ times a wavelength of the frequency band, and a distance between the two first open ends 209 and 212 of the two second radiators 207 and 210 is ½ times the wavelength of the frequency band. When the first signal feed source 204 inputs a signal to the first feed end 203, a current will be generated in the first radiator 202 and have a coupling effect with the two second radiators 207 and 210 to generate a resonant mode in the frequency band.

In addition, as shown in FIG. 1, the second antenna structure A2 and the first antenna structure A1 intersect to form an angle. Specifically, the second antenna structure A2 is perpendicular to the first antenna structure A1, and a third radiator 213 straddles the first radiator 202 and is spaced apart from the first radiator 202. Such a configuration contributes to isolation performance between the first antenna structure A1 and the second antenna structure A2.

The second antenna structure A2 includes the third radiator 213 and two fourth radiators 218 and 221. The third radiator 213 is disposed on a third surface 217*a* of the second insulation plate 217, and the two fourth radiators 218 and 221 are disposed on a fourth surface 217*b* of the second insulation plate 217 and are spaced apart from the third radiator 213 by the second insulation plate 217. Each of the third radiator 213 and the two fourth radiators 218 and 221 has at least one bend. The third radiator 213 is in a U shape, and each of the two fourth radiators 218 and 221 is in an L shape. However, the disclosure is not limited thereto.

Specifically, as shown in FIG. 2B, the third radiator 213 includes a second feed end 214 and a third ground end 216, and the third ground end 216 is connected to the ground plane 201. The third radiator 213 includes a sixth section 213*a*, a seventh section 213*b*, and an eighth section 213*c* that are connected in sequence. The second feed end 214 is located at the sixth section 213*a*, and the third ground end 216 is located at the eighth section 213*c*. A second signal feed source 215 is connected to the second feed end 214.

The two fourth radiators 218 and 221 are disposed symmetrically to each other and are spaced apart from each other, and the two fourth radiators 218 and 221 are disposed in parallel on one side of the third radiator 213 and are spaced apart from the third radiator 213. A projection of the third radiator 213 on a plane where the two fourth radiators 218 and 221 are located partially overlaps the two fourth radiators 218 and 221.

The two fourth radiators 218 and 221 include two second open ends 220 and 223 and two fourth ground ends 219 and 222. The two second open ends 220 and 223 are far away from each other, and the two fourth ground ends 219 and 222 are connected to the ground plane 201. The two fourth radiators 218 and 221 include two ninth sections 218*a* and 221*a* and two tenth sections 218*b* and 221*b*. The two fourth ground ends 219 and 222 are located at the two ninth sections 218*a* and 221*a*, and the two second open ends 220 and 223 are located at the two tenth sections 218*b* and 221*b*. The projection of the third radiator 213 on the plane where the two fourth radiators 218 and 221 are located overlaps the two ninth sections 218*a* and 221*a*.

According to FIGS. 2A and 2B, the first insulation plate 206 includes an upper slot 206*c*, and the second insulation plate 217 includes a lower slot 217*c*. The lower slot 217*c* of the second insulation plate 217 is inserted into the upper slot 206*c* of the first insulation plate 206, so that the seventh section 213*b* straddles the second section 202*b*, and is spaced apart from the second section 202*b*.

Returning to FIG. 1, in this embodiment, extension directions of the first section 202*a*, the third section 202*c*, the two fourth sections 207*a* and 210*a*, the sixth section 213*a*, the eighth section 213*c*, and the two ninth sections 218*a* and 221*a* are parallel to each other. Extension directions of the second section 202*b* and the two fifth sections 207*b* and 210*b* are parallel to each other. Extension directions of the seventh section 213*b* and the two tenth sections 218*b* and 221*b* are parallel to each other.

The second antenna structure A2 resonates at the same frequency band as the first antenna structure A1. A length of the third radiator 213 is ¾ times the wavelength of the frequency band, and a distance between the two second open ends 220 and 223 of the two fourth radiators 218 and 221 is ½ times the wavelength of the frequency band. When the second signal feed source 215 inputs a signal to the second feed end 214, a current will be generated on the third radiator 213 and have the coupling effect with the two fourth radiators 218 and 221 to generate another resonant mode in the frequency band. The antenna module 200 forms a dual-polarized cross dipole antenna through the above structure.

Figure 3:
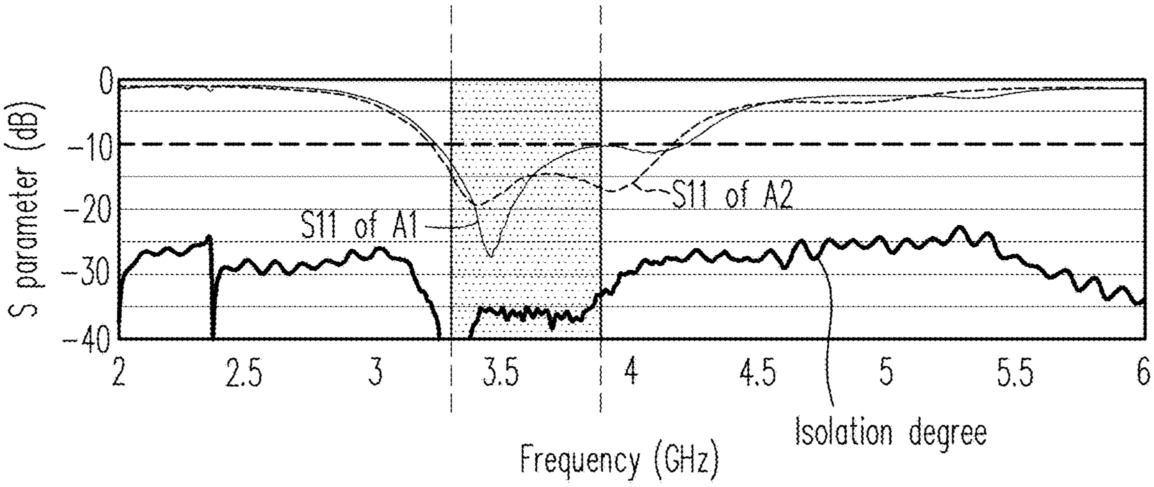
FIG. 3 is a plot diagram of frequency vs. S parameter of the antenna module in FIG. 1.

FIG. 3 is a plot diagram of frequency vs. S parameter of the antenna module in FIG. 1. Referring to FIG. 3, according to a S11 curve of the first antenna structure A1 and a S11 curve of the second antenna structure A2, operating frequencies of the first antenna structure A1 and the second antenna structure A2 cover a range of 3300 MHz to 3800 MHz, which meets the requirements for the frequency band of 5G n78. In addition, isolation between the first antenna structure A1 and the second antenna structure A2 may be less than or equal to −35.0 dB, thus achieving good performance.

Figure 4:
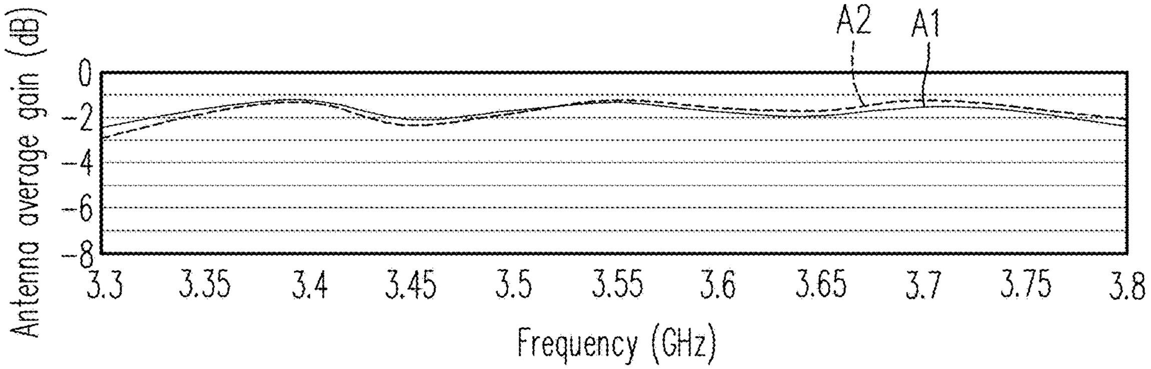
FIG. 4 is a plot diagram of frequency vs. antenna average gain of the antenna module in FIG. 1.

FIG. 4 is a plot diagram of frequency vs. antenna average gain of the antenna module in FIG. 1. Referring to FIG. 4, the operating frequencies of the first antenna structure A1 and the second antenna structure A2 cover the range of 3300 MHz to 3800 MHz, and an average antenna gain of the first antenna structure A1 and the second antenna structure A2 is at least −2.8 dB, which is greater than −3.0 dB and meets the requirements of the industry.

Figure 5:
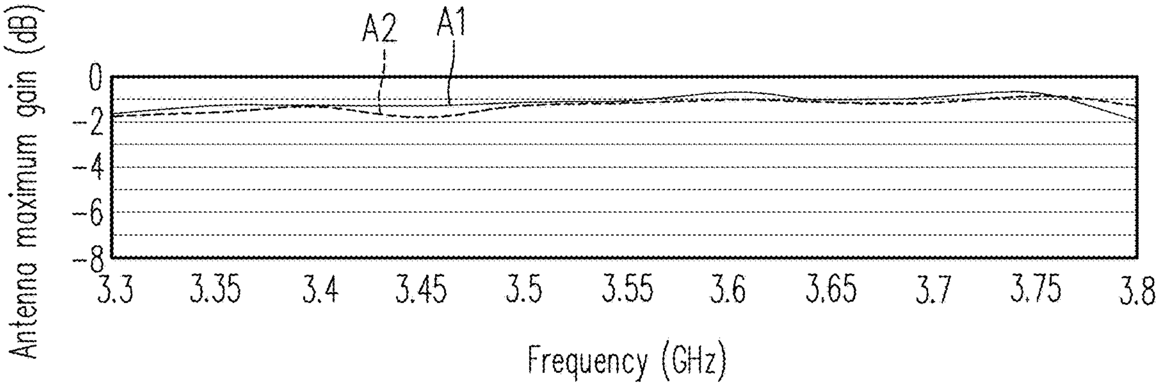
FIG. 5 is a plot diagram of frequency vs. antenna maximum gain of the antenna module in FIG. 1.

FIG. 5 is a plot diagram of frequency vs. antenna maximum gain of the antenna module in FIG. 1. Referring to FIG. 5, the operating frequencies of the first antenna structure A1 and the second antenna structure A2 cover the range of 3300 MHz to 3800 MHz, and an antenna maximum gain of the first antenna structure A1 and the second antenna structure A2 is at least 6.2 dB, which is greater than 6.0 dB and meets the requirements of the industry.

The antenna module 200 in this embodiment may form the dual-polarized cross dipole antenna in a relatively simple form. Only two circuit boards are required to form the dual-polarized cross dipole antenna, which may save at least 30% of the manufacturing cost, achieve cost-saving effects, and have good antenna performance.

Based on the above, the first ground end of the first radiator of the first antenna structure of the antenna module in the disclosure is connected to the ground plane. The two second radiators of the first antenna structure are disposed symmetrically to each other and are spaced apart from each other. The two first open ends of the two second radiators are far away from each other. The two second ground ends of the two second radiators are connected to the ground plane. The second antenna structure and the first antenna structure intersect to form an angle, and the third ground end of the third radiator of the second antenna structure is connected to the ground plane. The two fourth radiators of the second antenna structure are disposed symmetrically to each other and are spaced apart from each other. The two second open ends of the two fourth radiators are far away from each other. The two fourth ground ends of the two fourth radiators are connected to the ground plane. Through the above design, the antenna module may form the dual-polarized cross dipole antenna in a relatively simple form, thereby achieving the cost-saving effects and having the good antenna performance.

What is claimed is:

1. An antenna module, comprising:

a ground plane;

a first antenna structure, comprising:

a first radiator comprising a first feed end and a first ground end, wherein the first ground end is connected to the ground plane; and two second radiators disposed symmetrically to each other and spaced apart from each other, wherein the two second radiators are disposed in parallel on one side of the first radiator and are spaced apart from the first radiator, the two second radiators comprise two first open ends and two second ground ends, the two first open ends are far away from each other, and the two second ground ends are connected to the ground plane; and a second antenna structure intersecting the first antenna structure to form an angle and comprising:

a third radiator comprising a second feed end and a third ground end, wherein the third ground end is connected to the ground plane; and two fourth radiators disposed symmetrically to each other and spaced apart from each other, wherein the two fourth radiators are disposed in parallel on one side of the third radiator and are spaced apart from the third radiator, the two fourth radiators comprise two second open ends and two fourth ground ends, the two second open ends are far away from each other, and the two fourth ground ends are connected to the ground plane, wherein the second antenna structure is perpendicular to the first antenna structure, and the third radiator straddles the first radiator and is spaced apart from the first radiator.

2. The antenna module according to claim 1, wherein each of the first radiator, the two second radiators, the third radiator, and the two fourth radiators has at least one bend.

3. The antenna module according to claim 1, wherein each of the first radiator and the third radiator is in a U shape, and each of the two second radiators and the two fourth radiators is in an L shape.

4. The antenna module according to claim 1, wherein a projection of the first radiator on a plane where the two second radiators are located partially overlaps the two second radiators, and a projection of the third radiator on a plane where the two fourth radiators are located partially overlaps the two fourth radiators.

5. The antenna module according to claim 1, wherein the first radiator comprises a first section, a second section, and a third section that are connected in sequence, the first feed end is located at the first section, the first ground end is located at the third section, the two second radiators comprise two fourth sections and two fifth sections, the two second ground ends are located at the two fourth sections, the two first open ends are located at the two fifth sections, the third radiator comprises a sixth section, a seventh section, and an eighth section that are connected in sequence, the second feed end is located at the sixth section, the third ground end is located at the eighth section, the two fourth radiators comprise two ninth sections and two tenth sections, the two fourth ground ends are located at the two ninth sections, the two second open ends are located at the two tenth sections, and the seventh section straddles the second section and is spaced apart from the second section.

6. The antenna module according to claim 5, wherein a projection of the first radiator on a plane where the two second radiators are located overlaps the two fourth sections, and a projection of the third radiator on a plane where the two fourth radiators are located overlaps the two ninth sections.

7. The antenna module according to claim 5, wherein extension directions of the first section, the third section, the two fourth sections, the sixth section, the eighth section, and the two ninth sections are parallel to each other, extension directions of the second section and the two fifth sections are parallel to each other, and extension directions of the seventh section and the two tenth sections are parallel to each other.

8. The antenna module according to claim 1, wherein the first antenna structure resonates at a frequency band, a length of the first radiator is ¾ times a wavelength of the frequency band, the second antenna structure resonates at the frequency band, and a length of the third radiator is ¾ times the wavelength of the frequency band.

9. The antenna module according to claim 1, wherein the first antenna structure resonates at a frequency band, a distance between the two first open ends of the two second radiators is ½ times a wavelength of the frequency band, the second antenna structure resonates at the frequency band, and a distance between the two second open ends of the two fourth radiators is ½ times the wavelength of the frequency band.

10. The antenna module according to claim 1, further comprising:

a first insulation plate, wherein the first radiator is disposed on a first surface of the first insulation plate, and the two second radiators are disposed on a second surface of the first insulation plate; and a second insulation plate, wherein the third radiator is disposed on a third surface of the second insulation plate, and the two fourth radiators are disposed on a fourth surface of the second insulation plate.

* * * * *